United States Patent
Taylor et al.

(10) Patent No.: US 11,320,897 B2
(45) Date of Patent: May 3, 2022

(54) ADJUSTABLE USER PREFERENCE SETTINGS USING A VIRTUAL REALITY DEVICE

(71) Applicant: Bank of America Corporation, Charlotte, NC (US)

(72) Inventors: Jo-Ann Taylor, Godalming (GB); Michael J. Sbandi, Charlotte, NC (US); Michael R. Young, Davidson, NC (US)

(73) Assignee: Bank of America Corporation, Charlotte, NC (US)

( * ) Notice: Subject to any disclaimer, the term of this patent is extended or adjusted under 35 U.S.C. 154(b) by 4 days.

(21) Appl. No.: 17/035,373

(22) Filed: Sep. 28, 2020

(65) Prior Publication Data
US 2022/0100262 A1    Mar. 31, 2022

(51) Int. Cl.
*G06F 3/01*     (2006.01)
*G06F 9/445*    (2018.01)
*G06T 19/00*    (2011.01)
*G06N 20/00*    (2019.01)

(52) U.S. Cl.
CPC ............ *G06F 3/011* (2013.01); *G06F 9/4451* (2013.01); *G06N 20/00* (2019.01); *G06T 19/003* (2013.01)

(58) Field of Classification Search
CPC .................. A61F 9/08; G02B 27/0172; G02B 2027/0138; G02B 2027/0178; G02B 2027/0187; G06F 1/163; G06F 3/011; G06F 3/013; G06F 3/0304; G06T 19/006; G09B 21/008
See application file for complete search history.

(56) References Cited

U.S. PATENT DOCUMENTS

| | | |
|---|---|---|
| 6,801,199 B1 | 10/2004 | Wallman |
| 6,876,992 B1 | 4/2005 | Sullivan |
| 7,035,809 B2 | 4/2006 | Miller et al. |
| 7,243,105 B2 | 7/2007 | Thint et al. |
| 7,319,971 B2 | 1/2008 | Abrahams et al. |
| 9,229,905 B1 | 1/2016 | Penilla et al. |
| 9,529,917 B2 | 12/2016 | McConnell et al. |
| 9,542,452 B1 | 1/2017 | Ross et al. |
| 9,639,677 B1 | 5/2017 | O'Malley |
| 9,824,601 B2 | 11/2017 | Grimaud et al. |

(Continued)

FOREIGN PATENT DOCUMENTS

| | | |
|---|---|---|
| AU | 2015218438 A1 | 3/2016 |
| EP | 1598760 A1 | 11/2005 |

*Primary Examiner* — Nelson M Rosario

(57) ABSTRACT

A device is configured to establish a network connection with a virtual reality device and to identify a user account that is associated with the virtual reality device. The device is further configured to send a virtual simulation survey to the virtual reality device. The virtual simulation survey includes a list of virtual simulations that can be rendered by the virtual reality device. The device is further configured to receive a survey response from the virtual reality device. The survey response identifies one or more virtual simulations from the list of virtual simulations. The device is further configured to determine a cumulative user preference settings value based on the virtual simulations identified in the survey response and to modify user preference settings within the user account based on the cumulative user preference settings value.

12 Claims, 4 Drawing Sheets

(56) References Cited

U.S. PATENT DOCUMENTS

| | | |
|---|---|---|
| 9,961,161 B2 | 5/2018 | Chen et al. |
| 10,042,939 B2 | 8/2018 | Sinha et al. |
| 10,102,774 B2 | 10/2018 | Bahree et al. |
| 10,216,397 B2 | 2/2019 | McConnell |
| 10,223,248 B2 | 3/2019 | Friedenberg |
| 10,339,502 B2 | 7/2019 | Kurjanowicz et al. |
| 10,397,363 B2 | 8/2019 | Narayanan et al. |
| 10,489,287 B2 | 11/2019 | Friedenberg |
| 10,535,018 B1 | 1/2020 | Kenthapadi et al. |
| 10,687,756 B1 | 6/2020 | Jacobsen |
| 2002/0077793 A1 | 6/2002 | Poncet |
| 2003/0182178 A1 | 9/2003 | D'Elena et al. |
| 2004/0030628 A1 | 2/2004 | Takamoto et al. |
| 2004/0073505 A1 | 4/2004 | Wright |
| 2005/0108083 A1 | 5/2005 | Peterson |
| 2005/0228622 A1 | 10/2005 | Jacobi |
| 2006/0136327 A1 | 6/2006 | You |
| 2006/0224500 A1 | 10/2006 | Stane et al. |
| 2007/0016955 A1 | 1/2007 | Goldberg et al. |
| 2009/0181353 A1 | 7/2009 | Dasgupta |
| 2010/0161503 A1 | 6/2010 | Foster |
| 2011/0045452 A1 | 2/2011 | Bejar et al. |
| 2011/0047114 A1 | 2/2011 | Marvell et al. |
| 2013/0282605 A1 | 10/2013 | Noelting |
| 2014/0278821 A1 | 9/2014 | McConnell |
| 2014/0297562 A1 | 10/2014 | Beale |
| 2015/0227892 A1 | 8/2015 | Goel et al. |
| 2015/0381579 A1 | 12/2015 | Lundin et al. |
| 2016/0284026 A1 | 9/2016 | Kulkarni |
| 2016/0308998 A1 | 10/2016 | Bonmassar et al. |
| 2016/0335905 A1 | 11/2016 | Barber et al. |
| 2017/0020430 A1 | 1/2017 | Drakoulis |
| 2017/0116870 A1 | 4/2017 | Brem et al. |
| 2017/0142220 A1 | 5/2017 | Libow et al. |
| 2018/0032616 A1* | 2/2018 | Wang .................. G06Q 30/0281 |
| 2018/0040059 A1* | 2/2018 | Cruz .................. G06Q 30/0643 |
| 2018/0089170 A1 | 3/2018 | Kenthapadi |
| 2019/0320964 A1 | 10/2019 | Matto et al. |

* cited by examiner

ADJUSTABLE USER PREFERENCE SETTINGS USING A VIRTUAL REALITY DEVICE

TECHNICAL FIELD

The present disclosure relates generally to virtual reality devices, and more specifically to adjusting user preference settings using a virtual reality device.

BACKGROUND

In current computer systems, managing user preference settings poses several technical challenges. Typically, user preference settings are initially provided by a user but then may never be updated or changed by the user over time. This can result in less than optimal settings which may negatively impact the performance of the computer system. Existing systems lack the ability to learns a user's behavior or to dynamically update a user's preference settings over time. At best, existing systems may periodically query a user to update their user preference settings. However, this approach of periodically sending requests to a large number of users quickly consumes processing resources and network bandwidth which may introduce latency for the computer system. This latency can have a detrimental effect on the performance and throughput of the computer system and other devices that rely on data from the computer system.

SUMMARY

The system disclosed in the present application provides a technical solution to the technical problems discussed above by using virtual reality technology and devices to dynamically control user preference settings. For example, the disclosed system is configured to manage user accounts based on how a user responds while participating in a virtual simulation. A virtual simulation is an interactive multimedia element that can be rendered and displayed using a virtual reality device. In this configuration, the system is configured to adjust user preference settings based on how the user reacts to different types of stimuli during a virtual simulation. The disclosed system provides several practical applications and technical advantages which include a process for dynamically adjusting user preference settings based on a user's behavior and their response to different types of stimuli while interacting with a virtual simulation. This process enables the system to update and modify a user's preference settings without prompting the user or relying on the user to manually update their user preference settings. This process avoids latency and alleviates the consumption of processing resources and network bandwidth by determining user preference settings while the user is already using the virtual reality device rather than sending separate requests to the user.

In one embodiment, the system comprises includes a network device that is configured to establish a network connection with a virtual reality device. After establishing the network connection, the network device sends a virtual simulation survey to the virtual reality device. The virtual simulation survey includes a list of virtual simulations that can be rendered by the virtual reality device. The network device receives a survey response from the virtual reality device in response to sending the virtual simulation survey. The survey response includes a user input that identifies one or more virtual simulations that the user is interested in experiencing from among the list of virtual simulations. The network device determines a cumulative user preference settings value based on the virtual simulations that the user identified in the survey response. The network device then modifies user preference settings within the user account based on the cumulative user preference settings value. By modifying the user preference settings based on the user's interests, the network device is able to coarsely modify how the user account is managed.

The network device is further configured to identify a virtual simulation from among the virtual simulation identified in the survey response and to send the identified virtual simulation to the virtual reality device. The virtual reality device is configured to collect biometric information about the user while the user interacts with the virtual simulation. After the user has interacted with the virtual simulation, the virtual reality device will send user response data to the network device. The user response data includes biometric information for the user before, during, and/or after the user interacts with the virtual simulation. The virtual reality device captures biometric information for the user using one or more biometric devices. Examples of biometric devices include, but are not limited to, monitors, retina scanners, pressure readers, oxygen meters, skin perspiration meters, sensors, a camera, a microphone, and/or any other suitable type of device for determining physical characteristics about a user.

The network device receives user response data from the virtual reality device that includes the captured biometric information. The network device inputs the user response data into a machine learning model. The machine learning model is configured to determine a user preference settings value based on the user response data. The network device obtains the user preference settings value from the machine learning model and modifies the user preference settings based on the user preference settings value obtained from the machine learning model. By modifying the user preference settings based on the user's biometric information, the network device is able to more finely modify how the user account is managed.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

System Overview

Figure 1:
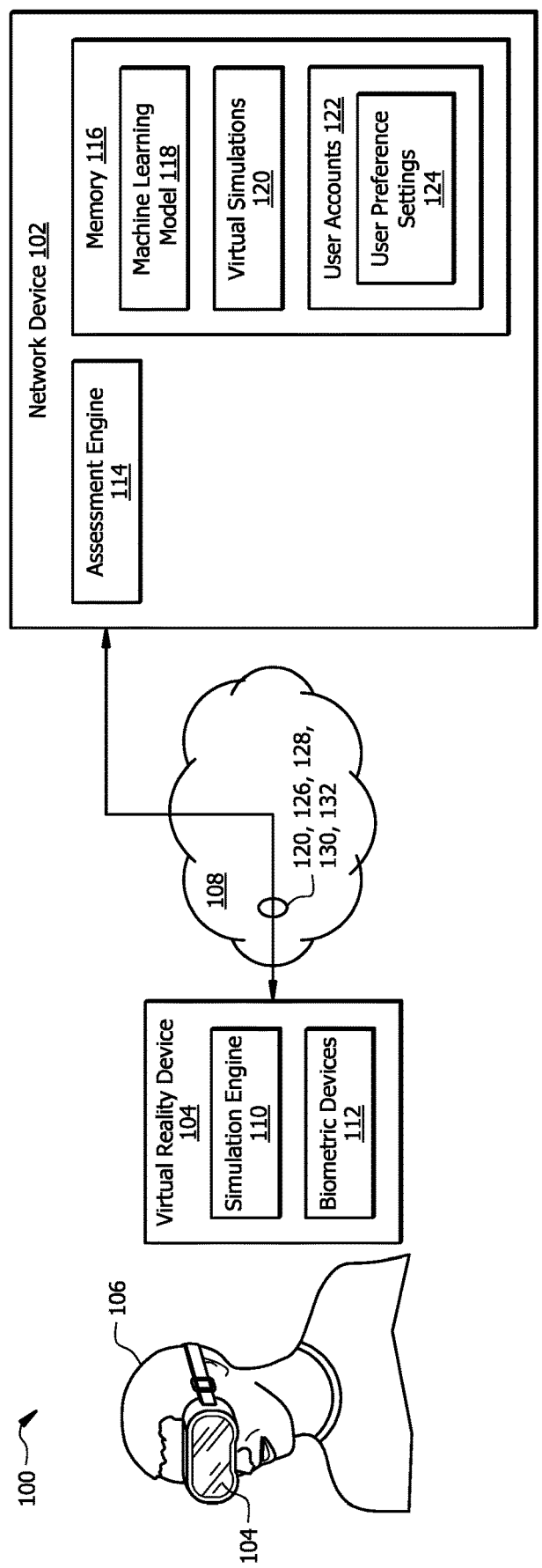
FIG. 1 is a schematic diagram of a virtual reality system that is configured to adjust user preference settings.

FIG. 1 is a schematic diagram of a virtual reality system 100 that is configured to adjust user preference settings 124 for user accounts 122. The virtual reality system 100 is generally configured to manage user accounts 122 based on how a user 106 responds while participating in a virtual simulation 120. As an example, a user account 122 may be associated with a gaming account. In this example, the user preference settings 124 may be associated with how the gaming account is managed. For instance, the user preference settings 124 may be used to control a difficulty level for the user 106. In this example, the virtual reality system 100 may also be used to quantify how a user 106 responds to various stimuli using virtual simulations 120 of physical activities. This process allows the virtual reality system 100 to learn how a user 106 reacts to different types of stimuli which may correlate to how difficult their gaming experience should be. For instance, a user 106 who responds well to virtual simulations 120 of extreme physical activities may also be okay with a more difficult setting for their user account 122. A user 106 who does not respond well to virtual simulation of extreme physical activities may prefer a less difficult setting for their user account 122. The virtual reality system 100 is configured to adjust the user preference settings 124 based on how the user 106 reacts to different types of stimuli.

As another example, a user account 122 may be associated with an investment account. In this example, the user preference settings 124 may be associated with how the investment account is managed. For instance, the user preference settings 124 may be used to control how aggressively a user 106 invests. In this example, the virtual reality system 100 may be used to determine how a user 106 responds to various stimuli using virtual simulations 120 of physical activities. This process allows the virtual reality system 100 to learn how a user 106 reacts to different types of stimuli which may correlate to how aggressively they would like their investment account to invest. For instance, a user 106 who responds well to virtual simulations 120 of extreme physical activities may also be okay with a more aggressive investment strategy for their user account 122. A user 106 who does not respond well to virtual simulation of extreme physical activities may prefer a less aggressive investment strategy for their user account 122. The virtual reality system 100 is configured to adjust the user preference settings 124 based on how the user 106 reacts to different types of stimuli. In other examples, the virtual reality system 100 may be used to adjust the user preference settings 124 for any other suitable type of user account.

In one embodiment, the system 100 comprises a network device 102 and a virtual reality device 104 that are in signal communication with each other over a network 108. The network 108 may be any suitable type of wireless and/or wired network including, but not limited to, all or a portion of the Internet, an Intranet, a private network, a public network, a peer-to-peer network, the public switched telephone network, a cellular network, a local area network (LAN), a metropolitan area network (MAN), a personal area network (PAN), a wide area network (WAN), and a satellite network. The network 108 may be configured to support any suitable type of communication protocol as would be appreciated by one of ordinary skill in the art.

Virtual Reality Device

In FIG. 1, the virtual reality device 104 is configured as a head-mounted wearable device. Other examples of wearable devices are integrated into a contact lens structure, an eyeglass structure, a visor structure, a helmet structure, or any other suitable structure. In some embodiments, the virtual reality device 104 may comprise a mobile user device integrated with the head-mounted wearable device. Examples of mobile user devices include, but are not limited to, a mobile phone and a smartphone. Additional details about the hardware configuration of the virtual reality device 104 are described in FIG. 3.

The virtual reality device 104 is generally configured to render and display virtual simulations 120 to a user 106. Examples of virtual simulations 120 include, but are not limited to, images, videos, interactive simulations, or any other suitable type of representation of physical activity. Examples of physical activities include, but are not limited to, hobbies, sports, extreme sports, and traveling. The virtual reality device 104 is further configured to use one or more biometric devices 112 to capture biometric information about a user 106 before, during, and/or after the user 106 interacts with a virtual simulation 120. Examples of biometric devices 112 include, but are not limited to, monitors, retina scanners, pressure readers, oxygen meters, skin perspiration meters, sensors, a camera, a microphone, and/or any other suitable type of device for determining physical characteristics about a user 106. The virtual reality device 104 is configured to output the captured biometric information to the network device 102 as user response data 126. An example of the virtual reality device 104 in operation is described below in FIG. 2.

Network Device

The network device 102 is generally configured to manage a plurality of user accounts 122. Examples of user accounts 122 include, but are not limited to, online accounts, financial accounts, investment accounts, gaming accounts, online video streaming accounts, or any other suitable type of account. Each user account 122 is uniquely associated with a user 106 and comprises one or more user preference settings 124 for the user 106. Examples of user preference settings 124 include, but are not limited to, user preferences, difficulty settings, investment strategy settings, or any other suitable type of settings associated with a user account 122. The network device 102 is further configured to provide virtual simulations 120 to the virtual reality device 104 to render and display to the user 106. In response to sending a virtual simulation 120 to the virtual reality device 104, the network device 102 will receive user response data 126 from the virtual reality device 104 that comprises biometric information for the user 106. The network device 102 is configured to modify the user preference settings 124 based on the user response data 126. This process allows the network device 102 to modify how the user account 122 is controlled or managed based on the user response data 126 and the user preference settings 124. An example of the network device 102 in operation is described below in FIG. 2.

Examples of network devices 102 include, but are not limited to, computers, laptops, tablets, smartphones, databases, memories, servers, or any other suitable type of networking device. The network device 102 comprises an assessment engine 114 and a memory 116. The network device 102 may be configured as shown or in any other suitable configuration. Additional details about the network device 102 are described in FIG. 4.

The assessment engine 114 is generally configured to provide virtual simulations 120 to the virtual reality device 104, to receive user response data 126 for the user 106 based on the user's 106 experience interacting with the virtual simulation 120, and to modify user preference settings 124 in a user account 122 that is associated with the user 106 based on the user response data 126. An example of the assessment engine 114 in operation is described in FIG. 2.

The memory 116 is configured to store machine learning models 118, virtual simulations 120, user accounts 122, and/or any other suitable type of data. The virtual simulations 120 and the user accounts 122 may be configured similarly as previously described above. In one embodiment, each virtual simulation 120 may be associated with a particular user preference settings value based on the content of the virtual simulation 120. As an example, a virtual simulation 120 of an extreme sport (e.g. sky diving) may be associated with a higher user preference settings value. Whereas, a virtual simulation 120 of a less extreme sport (e.g. cycling) may be associated with a relatively lower user preference settings value. This configuration provides a mapping between virtual simulations 120 and values for user preference settings 124 which can be used to control or manage a user account 122. For example, a user preference settings value or range of values may be associated with a particular configuration of user preference settings 124.

Examples of machine learning models 118 include, but are not limited to, a multi-layer perceptron or any other suitable type of neural network model. The machine learning model 118 is generally configured to determine a user preference settings value for a user account 122. The machine learning model 118 is configured to receive user response data 126 as an input and to output a user preference settings value based on the input user response data 126. The machine learning model 118 has been previously trained using training data that comprises biometric information for a plurality of users based on their interactions with virtual simulations 120. During the training process, the machine learning model 118 determines weight and bias values that allow the machine learning model 118 to map biometric information to different user preference settings values or configurations. Through this process, the machine learning model 118 is able to identify how to determine user preference settings values from biometric information. In one embodiment, the assessment engine 114 may be configured to train the machine learning model 118 using any suitable technique as would be appreciated by one of ordinary skill in the art. In some embodiments, the machine learning models 118 may be stored and/or trained by a device that is external from the network device 102.

Data Control Process

Figure 2:
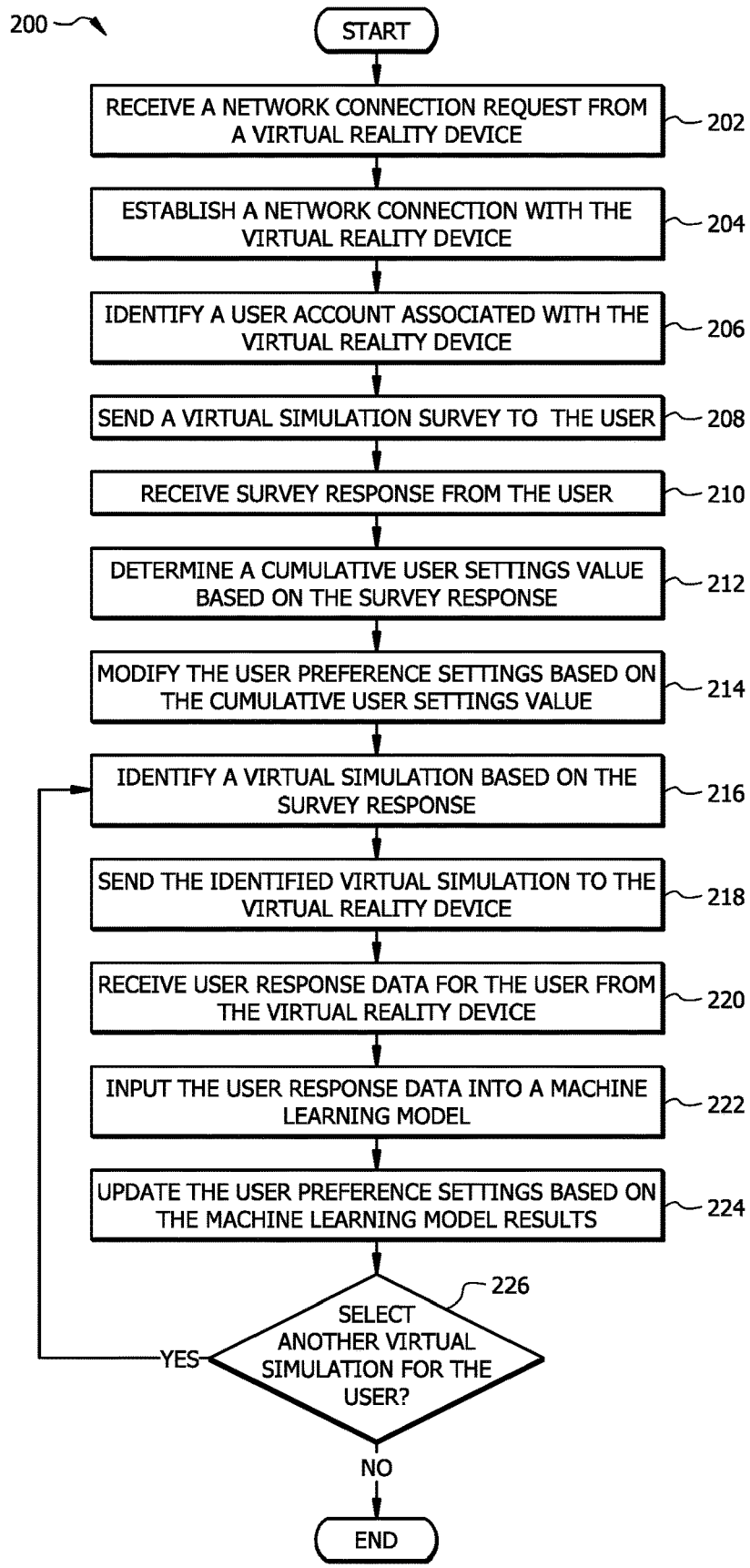
FIG. 2 is a flowchart of an embodiment of a user preference settings adjustment process using a virtual reality device.

FIG. 2 is a flowchart of an embodiment of a user preference settings adjustment process 200 using a virtual reality device 104. The network device 102 may employ process 200 to modify user preference settings 124 for controlling and managing a user account 122. More specifically, the network device 102 may employ process 200 to manage a user account 122 based on how a user 106 reacts while participating in a virtual simulation 120. This process allows the network device 102 to dynamically adjust user preference settings 124 based on a user's 106 behavior and their response to different types of stimuli while interacting with a virtual simulation 120. This process enables the network device 102 to update and modify a user's preference settings 124 without prompting the user 106 or relying on the user 106 to manually update their user preference settings 124. This process avoids latency and alleviates consumption of processing resources and network bandwidth by determining user preference settings while the user is already using the virtual reality device 104 rather than sending separate requests to the user 106.

At step 202, the network device 102 receives a network connection request 132 from a virtual reality device 104. The network connection request 132 comprises authentication credentials for the user 106 and a device identifier that uniquely identifies the virtual reality device 104. Examples of authentication credentials include, but are not limited to, a username and password, a personal identification number (PIN), a token, or any other suitable type of authentication credentials for authenticating a user 106. Examples of device identifiers include, but are not limited to, a media access control (MAC) address, an Internet Protocol (IP) address, a serial number, or any other suitable type of device identifier for the virtual reality device 104. In some embodiments, the network connection request 132 may further comprise any other suitable type of information about the user 106 and/or the virtual reality device 104.

At step 204, the network device 102 establishes a network connection with the virtual reality device 104. The network device 102 may use the authentication credentials and/or the device identifier from the network connection request 132 to determine whether the virtual reality device 104 passes authentication. The network device 102 may employ any suitable authentication protocol to authenticate the user 106 and the virtual reality device 104. After authenticating the user 106 and the virtual reality device, the network device 102 may establish any suitable type of wired or wireless network connection with the virtual reality device 104.

At step 206, the network device 102 identifies a user account 122 that is associated with the virtual reality device 104. In one embodiment, the network device 102 may use the authentication credentials and/or device identifier to identify a user account 122 that is linked with the user 106 and the virtual reality device 104.

At step 208, the network device 102 sends a virtual simulation survey 128 to the virtual reality device 104 for the user 106. The virtual simulation survey 128 comprises a list of virtual simulations 120 that are available for the user 106 to interact with using the virtual reality device 104. In one embodiment, the network device 102 may generate the list of virtual simulations 120 based on the capabilities of the virtual reality device 104. For example, the network device 102 may use the device identifier to identify a device type for the virtual reality device 104 and/or to identify the capabilities of the virtual reality device 104. The network device 102 may determine a hardware configuration, a firmware configuration, and/or a software configuration for the virtual reality device 104 based on the device identifier. For instance, the network device 102 may use a look-up table to determine configurations that are associated with a particular device identifier. The network device 102 may then select virtual simulations 120 for the virtual simulation survey 128 based on the device type and/or the capabilities of the virtual reality device 104. This process prevents the network device 102 from providing virtual simulations 120 that are not compatible with the virtual reality device 104. In some embodiments, the network device 102 may generate the list of virtual simulations 120 based on the user's 106 account information. For example, the network device 102 may use information (e.g. user preferences) from the user account 122 to select virtual simulations 120 for the virtual simulation survey 128. In other examples, the network device 102 may use any other suitable criteria for selecting virtual simulations 120 for the virtual simulation survey 128.

At step 210, the network device 102 receives a survey response 130 from the virtual reality device 104 for the user 106. The survey response 130 comprises a user input that identifies one or more virtual simulations 120 from the list of virtual simulations 120 in the virtual simulation survey 128. For example, the user 106 may provide a user input (e.g. a hand gesture or voice command) that identifies one or more virtual simulations 120 that the user 106 is interested in experiencing.

At step 212, the network device 102 determines a cumulative user preference settings value based on the survey response 130. Each virtual simulation 120 is associated with a user preference settings value. The network device 102 is configured to determine the user preference settings values for the one or more virtual simulations 120 that the user 106 identified in the survey response 130 and combines the determined user preference settings values to determine the cumulative user preference settings value.

At step 214, the network device 102 modifies the user preference settings 124 based on the cumulative user preference settings value. Modifying the user preference settings 124 modifies how the network device 102 controls or manages the user account 122. The network device 102 may modify user preferences, difficulty settings, investment strategy settings, or any other suitable type of settings associated with a user account 122 based on the cumulative user preference settings values. For example, a cumulative user preference settings value or range of values may be associated with a particular configuration of user preference settings 124. The network device 102 determines which configuration of user preference settings 124 corresponds with the cumulative user preference settings value and modifies the user preference settings 124 accordingly. This process allows the network device 102 to coarsely adjust how the user account 122 is controlled or managed based on the user's 106 preference of virtual simulations 120 that they would like to experience. The selection of virtual simulations 120 provides insight into a user's 106 preferences and how they would like their user account 122 managed.

At step 216, the network device 102 identifies a virtual simulation 120 based on the survey response 130. Here, the network device 102 identifies a virtual simulation 120 from memory 116 that corresponds with one of the virtual simulations 120 that is identified by the user 106 in the survey response 130. For example, the network device 102 may use an identifier for the virtual simulation 120 to obtain the virtual simulation 120 from memory 116. At step 218, the network device 102 sends the identified virtual simulation 120 to the virtual reality device 104.

At step 220, the network device 102 receives user response data 126 for the user 106 from the virtual reality device 104. The user response data 126 comprises biometric information for the user 106 before, during, and/or after the user 106 interacts with a virtual simulation 120 using the virtual reality device 104. As an example, the biometric information for the user 106 may comprise information associated with user 106 while the user 106 interacts with the simulation of the physical activity. For instance, the biometric information may comprise a numeric value that corresponds with information for the user 106. In some examples, the numerical value may be a maximum rate and/or a maximum pressure for the user 106. In other examples, the numerical value may be an increase amount. For instance, the numerical value may correspond with a difference between a baseline rate for the user 106 and a maximum rate for the user 106.

As another example, the biometric information for the user 106 may comprise information associated with a rate recovery time for the user 106 after the user 106 interacts with the simulation of the physical activity. In this example, the biometric information may comprise a numeric value that corresponds with an amount of time it takes the user's 106 rate to return to a baseline rate.

As another example, the biometric information for the user 106 may comprise information associated with how the user 106 breathes while the user 106 interacts with the simulation of the physical activity. In this example, the biometric information may comprise a numerical value that corresponds with a $VO_2$ max or any other suitable type of data that corresponds with the user's 106 breathing rate. For instance, the numerical value may correspond with a peak $VO_2$ max or a difference between a baseline $VO_2$ max for the user 106 and a peak $VO_2$ max for the user 106.

As another example, the biometric information for the user 106 may comprise information associated pupil dilation for the user 106 while the user 106 interacts with the simulation of the physical activity. In this example, the biometric information may comprise an image of the user's 106 pupil or a numerical value that corresponds with an amount of pupil dilation for the user 106. For instance, the numerical value may correspond with a difference between a baseline pupil dilation for the user 106 and a maximum pupil dilation for the user 106.

As another example, the biometric information for the user 106 may comprise information associated user 106 while the user 106 interacts with the simulation of the physical activity. In other examples, the biometric information may comprise any other suitable type or combination of biometric information for the user 106.

At step 222, the network device 102 inputs the user response data 126 into a machine learning model 118. Here, the network device 102 inputs at least a portion of the biometric information from the user response data 126 into a machine learning model 118. The machine learning model 118 is previously trained to determine a user preference settings value based on the biometric information that is provided to the machine learning model 118. In response to inputting the biometric information into the machine learning model 118, the network device 102 obtains a user preference settings value from the machine learning model 118.

At step 224, the network device 102 modifies the user preference settings 124 based on the machine learning model results. Here, the network device 102 modifies the user preference settings 124 based on the user preference settings value provided by the machine learning model 118. Modifying the user preference settings 124 further modifies how the network device 102 controls or manages the user account 122. The network device 102 may modify user preferences, difficulty settings, investment strategy settings, or any other suitable type of settings associated with a user account 122 based on the user preference settings value from the machine learning model 118. For example, a user preference settings value or range of values may be associated with a particular configuration of user preference settings 124. The network device 102 determines which configuration of user preference settings 124 corresponds with the user preference settings value and modifies the user preference settings 124 accordingly. This process allows the network device 102 to more finely adjust how the user account 122 is controlled or managed based on how the user 106 reacted to various virtual simulations 120 that they experienced.

At step 226, the network device 102 determines whether to select another virtual simulation 120 for the user 106. Here, the network device 102 determines whether all of the virtual simulations 120 that were requested by the user 106 in the survey response 130 have been sent to the virtual reality device 104. The network device 102 will determine to select another virtual simulation 120 for the user 106 when at least one of the virtual simulations 120 that was requested by the user 106 in the survey response 130 has not been sent to the virtual reality device 104. The network device 102 returns to step 216 in response to determining to select another virtual simulation 120 for the user 106. In this case, the network device 102 returns to step 216 to select another virtual simulation 120 from among the virtual simulations 120 that was requested by the user 106 in the survey response 130. The network device 102 sends the next virtual simulation 120 to the virtual reality device 104 and repeats steps 216-226. Otherwise, the network device 102 terminates process 200 in response to determining not to select another virtual simulation 120 for the user 106. In this case, the network device 102 determines that all of the virtual simulations 120 that were requested by the user 106 in the survey response 130 have been sent to the user 106 and terminates process 200.

Hardware Configuration for a Virtual Reality Device

Figure 3:
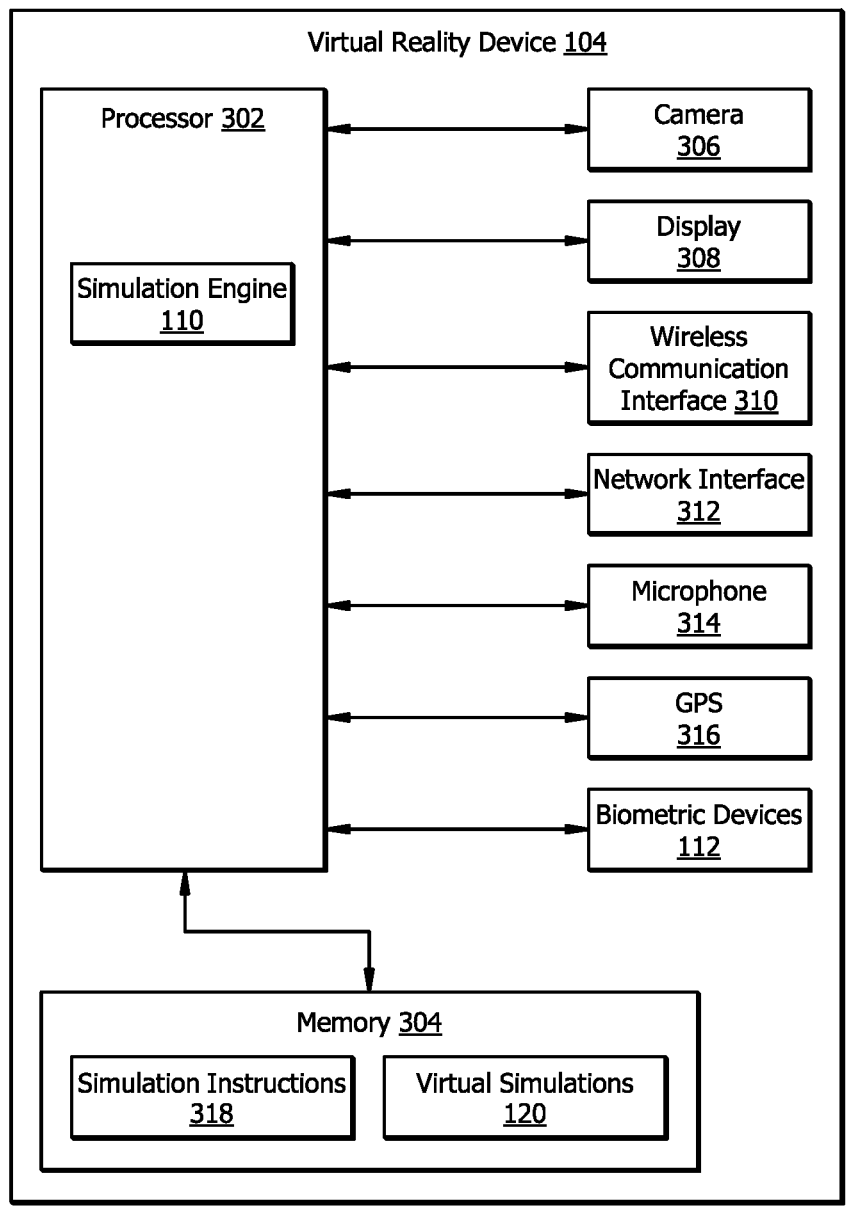
FIG. 3 is an embodiment of a virtual reality device.

FIG. 3 is a schematic diagram of an embodiment of a virtual reality device 104 employed by the virtual reality system 100. In one embodiment, the virtual reality device 104 comprises a processor 302, a memory 304, a camera 306, a display 308, a wireless communication interface 310, a network interface 312, a microphone 314, a global position system (GPS) sensor 316, and one or more biometric devices 112. The virtual reality device 104 may be configured as shown or in any other suitable configuration. For example, virtual reality device 104 may comprise one or more additional components and/or one or more shown components may be omitted.

Camera

Examples of the camera 306 include, but are not limited to, charge-coupled device (CCD) cameras and complementary metal-oxide-semiconductor (CMOS) cameras. The camera 306 is configured to capture images of people, text, and objects within a real environment. The camera 306 is configured to capture images continuously, at predetermined intervals, or on-demand. For example, the camera 306 is configured to receive a command from a user to capture an image. In another example, the camera 306 is configured to continuously capture images to form a video stream of images. The camera 306 is operable coupled to simulation engine 110 and provides images to the simulation engine 110 to send to the network device 102 for processing, for example, to identify gestures, facial expressions, and/or pupil dilation for the user 106.

Display

The display 308 is configured to present visual information to a user 106 using virtual or graphical objects in a virtual reality environment in real-time. In an embodiment, the display 308 is a wearable optical head-mounted display configured to reflect projected images for the user 106 to see. In another embodiment, the display 308 is a wearable head-mounted device comprising one or more graphical display units integrated with the structure of the wear head-mounted device. Examples of configurations for graphical display units include, but are not limited to, a single graphical display unit, a single graphical display unit with a split-screen configuration, and a pair of graphical display units. The display 308 may comprise graphical display units, lens, semi-transparent mirrors embedded in an eyeglass structure, a visor structure, or a helmet structure. Examples of display units include, but are not limited to, a cathode ray tube (CRT) display, a liquid crystal display (LCD), a liquid crystal on silicon (LCOS) display, a light-emitting diode (LED) display, an active-matrix OLED (AMOLED), an organic LED (OLED) display, a projector display, or any other suitable type of display as would be appreciated by one of ordinary skill in the art upon viewing this disclosure. In another embodiment, the graphical display unit is a graphical display on a user device. For example, the graphical display unit may be the display of a tablet or smartphone configured to display virtual or graphical objects in a virtual reality environment in real-time.

Wireless Communication Interface

Examples of the wireless communication interface 310 include, but are not limited to, a Bluetooth interface, a radio frequency identifier (RFID) interface, a near-field communication (NFC) interface, a LAN interface, a PAN interface, a WAN interface, a Wi-Fi interface, a ZigBee interface, or any other suitable wireless communication interface as would be appreciated by one of ordinary skill in the art upon viewing this disclosure. The wireless communication interface 310 is configured to allow the processor 302 to communicate with other devices (e.g. network device 102 and/or biometric devices 112). For example, the wireless communication interface 310 is configured to allow the processor 302 to send and receive signals with biometric devices 112 that are associated with the user 106. The wireless communication interface 310 is configured to employ any suitable communication protocol.

Network Interface

The network interface 312 is configured to enable wired and/or wireless communications. The network interface 312 is configured to communicate data between the network device 102 and other devices (e.g. network device 102), systems, or domains. For example, the network interface 312 may comprise an NFC interface, a Bluetooth interface, Zigbee interface, a Z-wave interface, an RFID interface, a WIFI interface, a LAN interface, a WAN interface, a PAN interface, a modem, a switch, or a router. The processor 302 is configured to send and receive data using the network interface 312. The network interface 312 may be configured to use any suitable type of communication protocol as would be appreciated by one of ordinary skill in the art.

Microphone

Microphone 314 is configured to capture audio signals (e.g. voice commands) from a user 106. The microphone 314 is configured to capture audio signals continuously, at predetermined intervals, or on-demand. The microphone 314 is operably coupled to the simulation engine 110 and provides captured audio signals to the simulation engine 110 to send to the network device 102 for processing, for example, to identify voice expressions or breathing sounds for the user 106.

GPS

The GPS sensor 316 is configured to capture and to provide geographical location information. For example, the GPS sensor 316 is configured to provide the geographic location of a user 106 employing the virtual reality device 104. The GPS sensor 316 is configured to provide the geographic location information as a relative geographic location or an absolute geographic location. The GPS sensor 316 provides the geographic location information using geographic coordinates (i.e. longitude and latitude) or any other suitable coordinate system.

Biometric Devices

Biometric devices 112 are configured to capture information about a person's physical characteristics and to output user response data 126 that comprises the captured information. Examples of biometric devices 112 include, but are not limited to, monitors, retina scanners, pressure readers, oxygen meters, skin perspiration meters, sensors, a camera 306, a microphone 314, and/or any other suitable type of device for determining physical characteristics about a user 106. The user response data 126 is a signal that is uniquely linked to a person based on their physical characteristics. For example, a biometric device 112 may be configured to perform a retinal scan of the user's eye and to generate user response data 126 that comprises biometric information about a pupil dilation for the user 106 based on the retinal scan. As another example, a biometric device 112 may be configured to measure a user's 106 rate and/or pressure and to generate user response data 126 that comprises biometric information about the user's 106 rate and/or pressure. As another example, a biometric device 112 may be configured to measure a user's 106 level of perspiration and to generate user response data 126 that comprises biometric information about the user's 106 level of perspiration. In other examples, a biometric device 112 may be configured to measure any other suitable type of physical characteristics about a user 106 and to generate user response data 126 that comprises biometric information about the user 106.

In some embodiments, one or more of the biometric devices 122 may be an external device that is in signal communication with the virtual reality device 104. For example, a biometric device 112 may be a wearable device (e.g. a smartwatch) that is in signal communication with the virtual reality device 104 using a Bluetooth connection. In other examples, a biometric device 112 may be any other suitable type of device.

Processor

The processor 302 comprises one or more processors operably coupled to the memory 304, the camera 306, the display 308, the wireless communication interface 310, the network interface 312, the microphone 314, the GPS sensor 316, and the biometric devices 112. The processor 302 is any electronic circuitry including, but not limited to, state machines, one or more central processing unit (CPU) chips, logic units, cores (e.g. a multi-core processor), field-programmable gate array (FPGAs), application-specific integrated circuits (ASICs), or digital signal processors (DSPs). The processor 302 may be a programmable logic device, a microcontroller, a microprocessor, or any suitable combination of the preceding. The processor 302 is communicatively coupled to and in signal communication with the memory 116. The one or more processors are configured to process data and may be implemented in hardware or software. For example, the processor 302 may be 8-bit, 16-bit, 32-bit, 64-bit, or of any other suitable architecture. The processor 302 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute simulation instructions 318 to implement a simulation engine 110. In this way, processor 302 may be a special-purpose computer designed to implement the functions disclosed herein. In an embodiment, the simulation engine 110 is implemented using logic units, FPGAs, ASICs, DSPs, or any other suitable hardware. The simulation engine 110 is configured to operate as described in FIGS. 1-2.

Memory

The memory 304 is operable to store any of the information described above with respect to FIGS. 1-2 along with any other data, instructions, logic, rules, or code operable to implement the function(s) described herein when executed by the processor 302. The memory 304 comprises one or more disks, tape drives, or solid-state drives, and may be used as an over-flow data storage device, to store programs when such programs are selected for execution, and to store instructions and data that are read during program execution. The memory 304 may be volatile or non-volatile and may comprise a read-only memory (ROM), random-access memory (RAM), ternary content-addressable memory (TCAM), dynamic random-access memory (DRAM), and static random-access memory (SRAM).

The memory 304 is operable to store simulation instructions 318, virtual simulations 120, and/or any other data or instructions. The simulation instructions 318 may comprise any suitable set of instructions, logic, rules, or code operable to execute the simulation engine 110. The virtual simulations 120 are configured similarly to the virtual simulations 120 described in FIGS. 1-2.

Hardware Configuration for a Network Device

Figure 4:
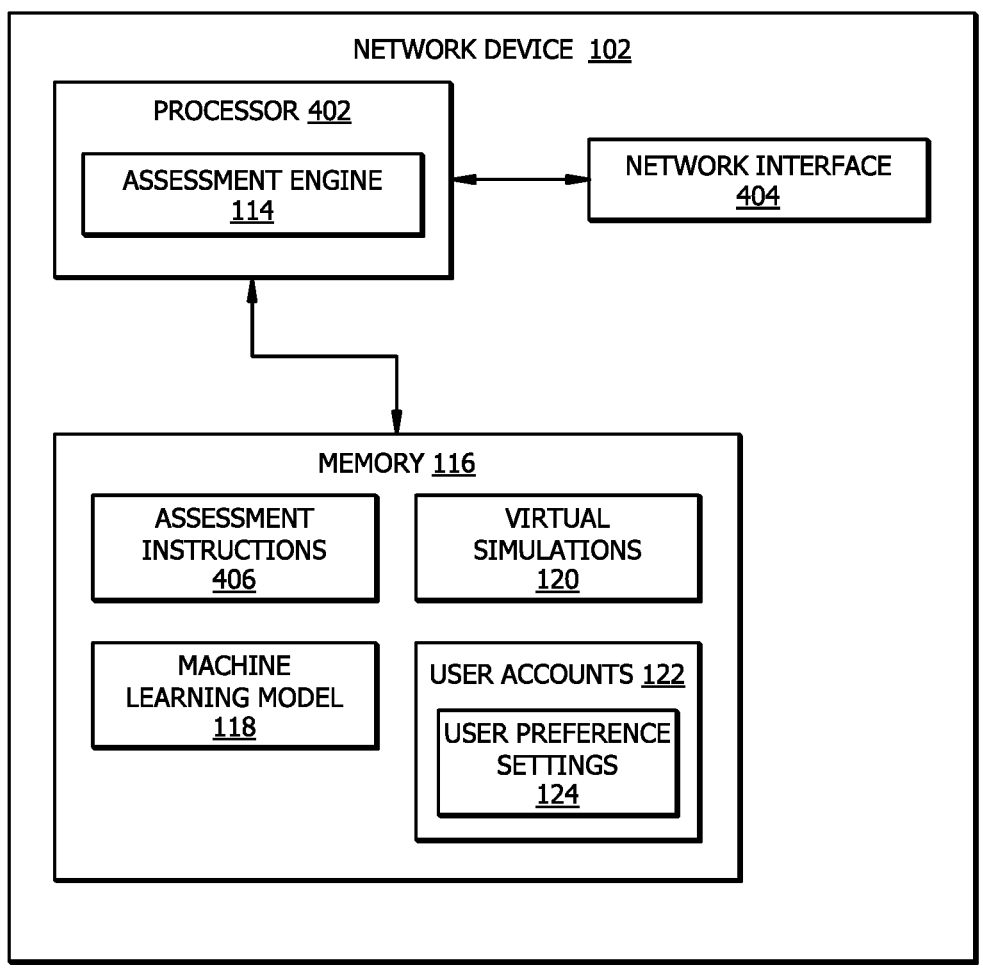
FIG. 4 is an embodiment of a device configured to manage user preference settings.

FIG. 4 is an embodiment of a device (e.g. a network device 102) configured to manage user preference settings 124. As an example, the network device 102 comprises a processor 402, a memory 116, and a network interface 404. The network device 102 may be configured as shown or in any other suitable configuration.

Processor

The processor 402 comprises one or more processors operably coupled to the memory 116. The processor 402 is any electronic circuitry including, but not limited to, state machines, one or more CPU chips, logic units, cores (e.g. a multi-core processor), FPGAs, ASICs, or DSPs. The processor 402 may be a programmable logic device, a microcontroller, a microprocessor, or any suitable combination of the preceding. The processor 402 is communicatively coupled to and in signal communication with the memory 116. The one or more processors are configured to process data and may be implemented in hardware or software. For example, the processor 402 may be 8-bit, 16-bit, 32-bit, 64-bit, or of any other suitable architecture. The processor 402 may include an ALU for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute assessment instructions 406 to implement an assessment engine 114. In this way, processor 402 may be a special-purpose computer designed to implement the functions disclosed herein. In an embodiment, the assessment engine 114 is implemented using logic units, FPGAs, ASICs, DSPs, or any other suitable hardware. The assessment engine 114 is configured to operate as described in FIGS. 1-2. For example, the assessment engine 114 may be configured to perform the steps of process 200 as described in FIG. 2.

Memory

The memory 116 is operable to store any of the information described above with respect to FIGS. 1-2 along with any other data, instructions, logic, rules, or code operable to implement the function(s) described herein when executed by the processor 402. The memory 116 comprises one or more disks, tape drives, or solid-state drives, and may be used as an over-flow data storage device, to store programs when such programs are selected for execution, and to store instructions and data that are read during program execution. The memory 116 may be volatile or non-volatile and may comprise a read-only memory (ROM), random-access memory (RAM), ternary content-addressable memory (TCAM), dynamic random-access memory (DRAM), and static random-access memory (SRAM).

The memory 116 is operable to store assessment instructions 406, machine learning models 118, virtual simulations 120, user accounts 122, and/or any other data or instructions. The assessment instructions 406 may comprise any suitable set of instructions, logic, rules, or code operable to execute the assessment engine 114. The machine learning models 118, the virtual simulations 120, and the user accounts 122 are configured similar to the machine learning models 118, the virtual simulations 120, and the user accounts 122 described in FIGS. 1-2.

Network Interface

The network interface 404 is configured to enable wired and/or wireless communications. The network interface 404 is configured to communicate data between the network device 102 and other devices (e.g. virtual reality device 104), systems, or domains. For example, the network interface 404 may comprise an NFC interface, a Bluetooth interface, Zigbee interface, a Z-wave interface, an RFID interface, a WIFI interface, a LAN interface, a WAN interface, a PAN interface, a modem, a switch, or a router. The processor 402 is configured to send and receive data using the network interface 404. The network interface 404 may be configured to use any suitable type of communication protocol as would be appreciated by one of ordinary skill in the art.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A network device, comprising:
a network interface configured to communicate with a virtual reality device;
a memory operable to store:
a plurality of user accounts, wherein:
each user account is uniquely associated with a user; and
each user account comprises user preference settings that are associated with the user; and
a plurality of virtual simulations, wherein:
each virtual simulation comprises a simulation of a physical activity that is configured to be rendered by the virtual reality device; and
each virtual simulation is associated with a user preference settings value that is based on the content of the virtual simulation; and
a processor operably coupled to the network interface and the memory, configured to:
receive a network connection request from the virtual reality device, wherein the network access request comprises a device identifier;
establish a network connection with the virtual reality device;
identify a user account that is associated with the virtual reality device based on the device identifier, wherein the user account is associated with a first user;
send a virtual simulation survey to the virtual reality device, wherein the virtual simulation survey comprises a list of virtual simulations from among the plurality of virtual simulations;
receive a survey response from the virtual reality device, wherein the survey response identifies one or more virtual simulations from the list of virtual simulations;
determine a cumulative user preference settings value based on the one or more virtual simulations identified in the survey response; and
modify user preference settings within the user account based on the cumulative user preference settings value, wherein modifying the user preference settings modifies how the user account is managed.

2. The device of claim 1, wherein the processor is further configured to:
identify a virtual simulation from among the one or more virtual simulation identified in the survey response;
send the identified virtual simulation to the virtual reality device;
receive user response data from the virtual reality device, wherein the user response data comprises biometric information for the first user while the first user interacts with the virtual simulation;
input the user response data into a machine learning model, wherein the machine learning model is configured to determine a user preference settings value based on the user response data;
obtain the user preference settings value from the machine learning model; and
modify the user preference settings based on the user preference setting value obtained from the machine learning model, wherein modifying the user preference settings modifies how the user account is managed.

3. The device of claim 2, wherein the biometric information for the first user comprises information associated with how the first user breathes while the first user interacts with the simulation of the physical activity.

4. The device of claim 2, wherein the biometric information for the first user comprises information associated pupil dilation for the first user while the first user interacts with the simulation of the physical activity.

5. A user preference settings adjustment method, comprising:
receiving a network connection request from a virtual reality device, wherein the network connection request comprises a device identifier;
establishing a network connection with the virtual reality device;

identifying a user account that is associated with the virtual reality device based on the device identifier, wherein:
  the user account is associated with a first user; and
  the user account comprises user preference settings that are associated with the first user;
sending a virtual simulation survey to the virtual reality device, wherein:
  the virtual simulation survey comprises a list of virtual simulations from among a plurality of virtual simulations;
  each virtual simulation comprises a simulation of a physical activity that is configured to be rendered by the virtual reality device; and
  each virtual simulation is associated with a user preference settings value that is based on the content of the virtual simulation;
receiving a survey response from the virtual reality device, wherein the survey response identifies one or more virtual simulations from the list of virtual simulations;
determining a cumulative user preference settings value based on the one or more virtual simulations identified in the survey response; and
modifying user preference settings within the user account based on the cumulative user preference settings value, wherein modifying the user preference settings modifies how the user account is managed.

6. The method of claim 5, further comprising:
identifying a virtual simulation from among the one or more virtual simulation identified in the survey response;
sending the identified virtual simulation to the virtual reality device;
receiving user response data from the virtual reality device, wherein the user response data comprises biometric information for the first user while the first user interacts with the virtual simulation;
inputting the user response data into a machine learning model, wherein the machine learning model is configured to determine a user preference settings value based on the user response data;
obtaining the user preference settings value from the machine learning model; and
modifying the user preference settings based on the user preference settings value obtained from the machine learning model, wherein modifying the user preference settings modifies how the user account is managed.

7. The method of claim 6, wherein the biometric information for the first user comprises information associated with how the first user breathes while the first user interacts with the simulation of the physical activity.

8. The method of claim 6, wherein the biometric information for the first user comprises information associated pupil dilation for the first user while the first user interacts with the simulation of the physical activity.

9. A computer program comprising executable instructions stored in a non-transitory computer-readable medium that when executed by a processor causes the processor to:
receive a network connection request from a virtual reality device, wherein the network connection request comprises a device identifier;
establish a network connection with the virtual reality device;
identify a user account that is associated with the virtual reality device based on the device identifier, wherein:
  the user account is associated with a first user; and
  the user account comprises user preference settings that are associated with the first user;
send a virtual simulation survey to the virtual reality device, wherein:
  the virtual simulation survey comprises a list of virtual simulations from among a plurality of virtual simulations;
  each virtual simulation comprises a simulation of a physical activity that is configured to be rendered by the virtual reality device; and
  each virtual simulation is associated with a user preference settings value that is based on the content of the virtual simulation;
receive a survey response from the virtual reality device, wherein the survey response identifies one or more virtual simulations from the list of virtual simulations;
determine a cumulative user preference settings value based on the one or more virtual simulations identified in the survey response; and
modify user preference settings within the user account based on the cumulative user preference settings value, wherein modifying the user preference settings modifies how the user account is managed.

10. The computer program of claim 9, further comprising instructions that when executed by the processor causes the processor to:
identify a virtual simulation from among the one or more virtual simulation identified in the survey response;
send the identified virtual simulation to the virtual reality device;
receive user response data from the virtual reality device, wherein the user response data comprises biometric information for the first user while the first user interacts with the virtual simulation;
input the user response data into a machine learning model, wherein the machine learning model is configured to determine a user preference settings value based on the user response data;
obtain the user preference settings value from the machine learning model; and
modify the user preference settings based on the user preference settings value obtained from the machine learning model, wherein modifying the user preference settings modifies how the user account is managed.

11. The computer program of claim 10, wherein the biometric information for the first user comprises information associated with how the first user breathes while the first user interacts with the simulation of the physical activity.

12. The computer program of claim 10, wherein the biometric information for the first user comprises information associated pupil dilation for the first user while the first user interacts with the simulation of the physical activity.

* * * * *